United States Patent
Feener et al.

(10) Patent No.: US 12,488,037 B2
(45) Date of Patent: Dec. 2, 2025

(54) IDENTIFYING PATTERNS IN LARGE QUANTITIES OF COLLECTED EMAILS

(71) Applicant: CrowdStrike, Inc., Sunnyvale, CA (US)

(72) Inventors: Tyler Feener, Toronto (CA); Eric Loui, Bethesda, MD (US); Stefan Stein, Cologne (DE); Arnaud Wald, Grenoble (FR); Tanya Widen, Maikammer (DE)

(73) Assignee: CrowdStrike, Inc., Sunnyvale, CA (US)

( * ) Notice: Subject to any disclaimer, the term of this patent is extended or adjusted under 35 U.S.C. 154(b) by 118 days.

(21) Appl. No.: 18/326,919

(22) Filed: May 31, 2023

(65) Prior Publication Data

US 2024/0403345 A1 Dec. 5, 2024

(51) Int. Cl.
*G06F 16/00* (2019.01)
*G06F 16/31* (2019.01)
*G06F 16/3329* (2025.01)
*G06F 16/35* (2019.01)

(52) U.S. Cl.
CPC ............ *G06F 16/35* (2019.01); *G06F 16/313* (2019.01); *G06F 16/325* (2019.01); *G06F 16/3329* (2019.01)

(58) Field of Classification Search
None
See application file for complete search history.

(56) References Cited

U.S. PATENT DOCUMENTS

| | | | |
|---|---|---|---|
| 10,216,837 B1 * | 2/2019 | Saikia | G06F 16/35 |
| 10,601,865 B1 * | 3/2020 | Mesdaq | H04L 63/1425 |
| 2008/0168144 A1 * | 7/2008 | Lee | G06F 16/353 |
| | | | 707/E17.09 |
| 2012/0096553 A1 * | 4/2012 | Srivastava | H04L 51/52 |
| | | | 709/206 |
| 2012/0209847 A1 * | 8/2012 | Rangan | G06F 16/3347 |
| | | | 707/769 |
| 2015/0067833 A1 * | 3/2015 | Verma | H04L 63/1483 |
| | | | 726/22 |
| 2015/0381533 A1 * | 12/2015 | Klemm | H04L 51/02 |
| | | | 709/206 |
| 2017/0161375 A1 * | 6/2017 | Stoica | G06F 16/353 |
| 2018/0052933 A1 * | 2/2018 | Verma | G06F 16/9535 |
| 2021/0311918 A1 * | 10/2021 | Cheng | G06F 11/0751 |

(Continued)

*Primary Examiner* — Jean M Corrielus
(74) *Attorney, Agent, or Firm* — Womble Bond Dickinson (US) LLP

(57) ABSTRACT

A system and method of detecting malicious activity in emails using pattern recognition. The method includes maintaining a plurality of associations between a plurality of emails and a plurality of multi-dimensional (MD) vectors of the plurality of emails. Each association is between a respective email of the plurality of emails and a respective MD vector of the plurality of MD vectors that corresponds to the respective email. The method includes identifying, based on one or more keywords, a set of MD vectors of the plurality of MD vectors. The method includes selecting, based on the plurality of associations, a set of emails associated with the set of MD vectors. The method includes generating, by a processing device, based on the set of emails or the set of MD vectors, a set of clusters to represent patterns in the set of emails.

12 Claims, 8 Drawing Sheets

(56) References Cited

U.S. PATENT DOCUMENTS

| | | | | |
|---|---|---|---|---|
| 2023/0351017 A1* | 11/2023 | Briliauskas | ........... | G06F 21/566 |
| 2024/0039730 A1* | 2/2024 | Millar | ................ | H04L 63/20 |
| 2024/0039733 A1* | 2/2024 | Millar | ................ | H04L 9/3247 |
| 2024/0039779 A1* | 2/2024 | Millar | ................ | H04L 63/20 |
| 2024/0039911 A1* | 2/2024 | Millar | ................ | H04L 41/06 |
| 2024/0193232 A1* | 6/2024 | Sloane | ............... | G06F 18/2325 |
| 2024/0273125 A1* | 8/2024 | Fusco | .................. | G06F 16/353 |
| 2024/0297795 A1* | 9/2024 | Millar | ................. | G06N 3/0455 |
| 2024/0338446 A1* | 10/2024 | Kulaga | ................ | G06F 21/566 |
| 2024/0361937 A1* | 10/2024 | Thakkar | ............... | G06F 3/0619 |
| 2024/0362137 A1* | 10/2024 | Krishna | ................... | G06F 8/62 |
| 2025/0030557 A1* | 1/2025 | Millar | ................ | H04L 63/0876 |

* cited by examiner

IDENTIFYING PATTERNS IN LARGE QUANTITIES OF COLLECTED EMAILS

TECHNICAL FIELD

The present disclosure relates generally to cyber security, and more particularly, to systems and methods of identifying patterns in large quantities of automatically collected emails.

BACKGROUND

Cybersecurity is the practice of protecting critical systems and sensitive information from digital attacks. Cybersecurity techniques are designed to combat threats against networked systems and applications, whether those threats originate from inside or outside of an organization.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Information technology (IT) systems automatically collect large quantities of emails from several different sources. However, analyzing the collected emails to identify emerging or changing trends, new threats, or otherwise noteworthy activity is a labor-intensive and demanding task. As a result, these IT systems are unable to identify and cluster emails that have similar content, employed tactics, or contained threats.

Aspects of the present disclosure address the above-noted and other deficiencies by processing, classifying, and encoding emails to enable grouping emails that are similar in content, employed tactics, or contained threats.

Benefits of the embodiments of the present disclosure may include a protection against application data theft or protection against wastage of computing resources (e.g., memory resources, power resources, processing resources, networking resources) of computers on a communication network because of potential compromises otherwise. Although, threats are constantly changing and adversaries are constantly updating their tools and techniques and campaigns, the embodiments of the present disclosure provide analysts with solutions for quickly and efficiently detecting and responding to these threats.

In an illustrative embodiment, a pattern recognition management (PRM) system maintains, in one or more databases or other collection of data, a plurality of associations between a plurality of emails and a plurality of multi-dimensional (MD) vectors of the plurality of emails. Each association is between a respective email of the plurality of emails and a respective MD vector of the plurality of MD vectors that corresponds to the respective email. The PRM system receives a request for one or more emails associated with one or more keywords. The PRM system identifies, based on one or more keywords, a set of MD vectors of the plurality of MD vectors. The PRM system selects, from the one or more databases, a set of emails associated with the set of MD vectors. The PRM system generates, based on the set of emails or the MD vectors, a set of clusters to represent patterns (e.g., content patterns) in the set of emails. The PRM system causes the set of clusters and/or the set of emails to appear (e.g., display, present) on a display (e.g., screen).

Figure 1:
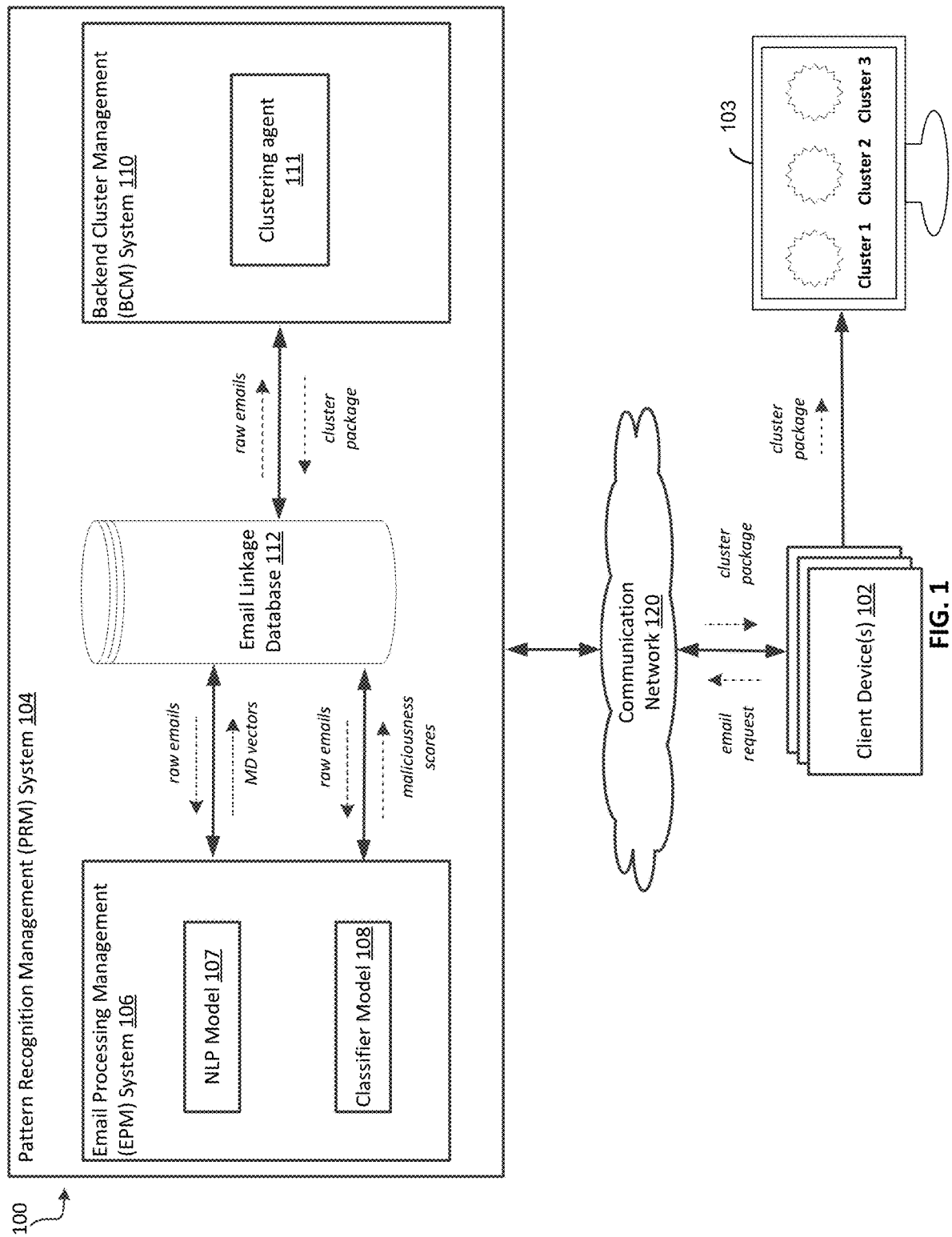
FIG. 1 is a block diagram depicting an example environment for identifying patterns in large quantities of automatically collected emails, according to some embodiments.

FIG. 1 is a block diagram depicting an example environment for identifying patterns in large quantities of automatically collected emails, according to some embodiments. Environment 100 includes a pattern recognition management (PRM) system 104 and one or more client devices 102 that are communicably coupled together via a communication network 120. The PRM system 104 includes and/or executes a natural language processing (NLP) model 107 that is trained to vectorize one or more portions (e.g., a subject of an email, a body of the email, a sender address, and/or a recipient address, etc.) into a multi-dimensional (MD) vector. The PRM system 104 includes and/or executes a classifier model 108 that is trained to generate, based on an email, a maliciousness score indicative of a likelihood of the email including malicious content.

The PRM system 104 includes an email linkage database 112. In some embodiments, the email linkage database 112 may be external (remote) to the PRM system 104 and whose contents are distributed across one or more databases that are physically separated from one another. The PRM system 104 stores, in the email linkage database 112, a plurality of emails and a plurality of email identifiers that corresponds to the plurality of emails. The PRM system 104 stores, in the email linkage database 112, a plurality of associations (e.g., linkages) between a plurality of emails, a plurality of multi-dimensional (MD) vectors of the plurality of emails, and a plurality of maliciousness scores. Each linkage associates a single email (or email identifier) to a single MD vector of the single email, and a maliciousness score of the single email.

The communication network 120 may be a public network (e.g., the internet), a private network (e.g., a local area network (LAN) or wide area network (WAN), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g., cell towers), etc. The communication network 120 may carry communications (e.g., data, message, packets, frames, etc.) between any other the computing device.

A PRM system 104 and client device 102 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

As shown, the EPM system 106 and the BCM system 110 are systems and/or components of the PRM system 104. Alternatively, the EPM system 106 may, in some embodiments, be a first computing device and the BCM system 110 may be a second computing device, such that the EPM system 106 and the BCM 110 are interconnected to the email linkage database 112 via the communication network 120.

A PRM system 104 may be one or more virtual environments. In one embodiment, a virtual environment may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.). The PRM system 104 may use the same type or different types of virtual environments. For example, all of the PRM systems 104 may be VMs. In another example, all of the PRM systems 104 may be containers. In a further example, some of the PRM systems 104 may be VMs, other PRM systems 104 may be containers, and other PRM systems 104 may be computing devices (or groups of computing devices).

Still referring to FIG. 1, the PRM system 104 maintains, in the email linkage database 112, a plurality of associations between a plurality of emails and a plurality of multi-dimensional (MD) vectors of the plurality of emails. Each association is between a respective email of the plurality of emails and a respective MD vector of the plurality of MD vectors that corresponds to the respective email. The PRM system 104 receives a request (e.g., email request) from a client device 102 for one or more emails associated with one or more keywords. The PRM system 104 identifies, based on one or more keywords, a set of MD vectors of the plurality of MD vectors. The PRM system 104 selects, from the one or more databases, a set of emails associated with the set of MD vectors. The PRM system 104 generates, based on the set of emails or the MD vectors, a set of clusters to represent patterns (e.g., differences in subject matter in the email content) in the set of emails. The PRM system 104 causes the set of clusters to appear (e.g., display, present) on a display (e.g., screen). For the example, the PRM system 104 transmits a cluster package including the set of clusters to the client device 102 to cause the client device to display the set of clusters and/or the set of emails according to the cluster package on a display.

Although FIG. 1 shows only a select number of computing devices (e.g., PRM system 104, client devices 102); the environment 100 may include any number of computing devices that are interconnected in any arrangement to facilitate the exchange of data between the computing devices.

Figure 2B:
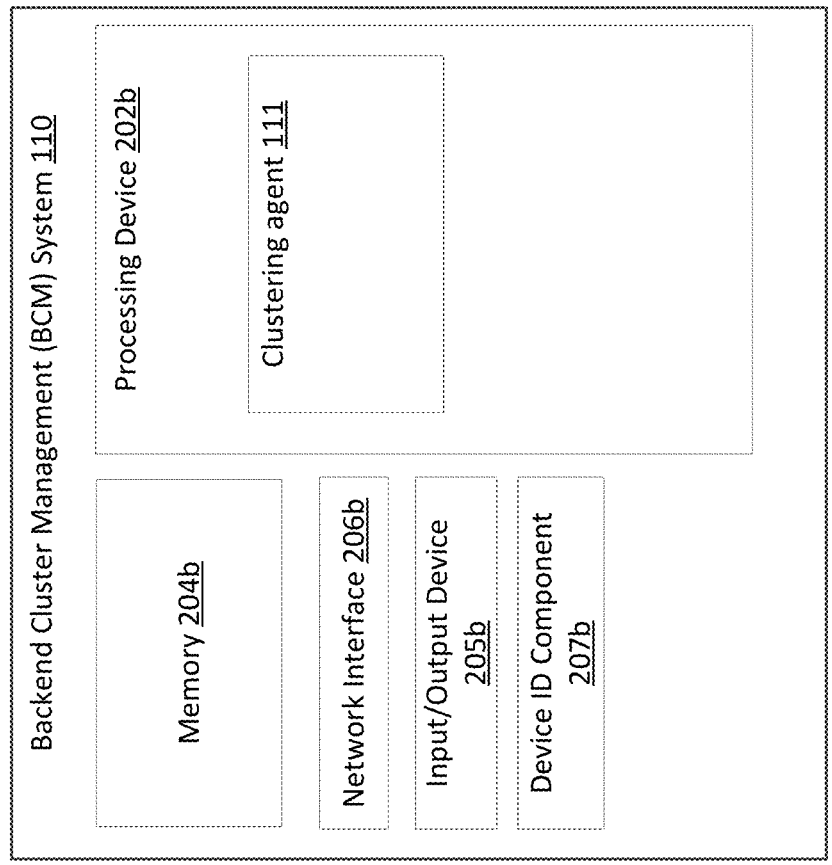
FIG. 2B is a block diagram depicting an example of the BCM system 110 of the environment in FIG. 1, according to some embodiments.
Figure 2A:
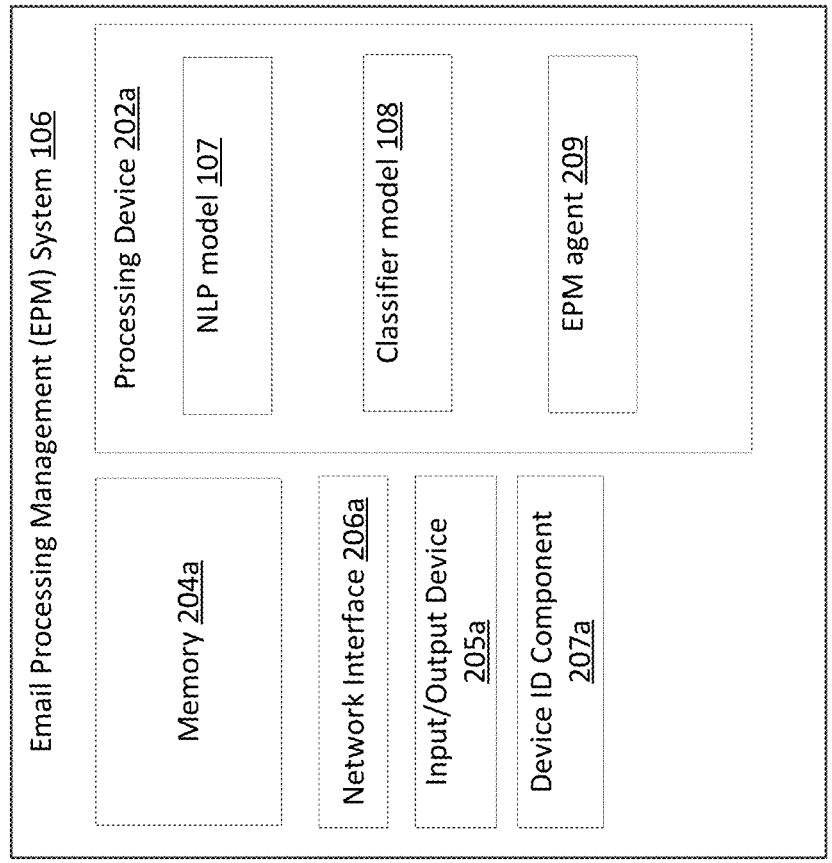
FIG. 2A is a block diagram depicting an example of the EPM system 106 of the environment in FIG. 1, according to some embodiments.

FIG. 2A is a block diagram depicting an example of the EPM system 106 of the environment in FIG. 1, according to some embodiments. While various devices, interfaces, and logic with particular functionality are shown, it should be understood that the EPM system 106 includes any number of devices and/or components, interfaces, and logic for facilitating the functions described herein. For example, the activities of multiple devices may be combined as a single device and implemented on the same processing device (e.g., processing device 402a), as additional devices and/or components with additional functionality are included.

The EPM system 106 includes a processing device 202a (e.g., general purpose processor, a PLD, etc.), which may be composed of one or more processors, and a memory 204a (e.g., synchronous dynamic random-access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may include one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the EPM system 106. In some embodiments, the processing device 202a and the memory 204a form various processing devices and/or circuits described with respect to the EPM 106. The instructions include code from any suitable computer programming language such as, but not limited to, C, C++, C#, Java, JavaScript, VBScript, Perl, HTML, XML, Python, TCL, and Basic.

The processing device 202 executes a management agent 209 that may be configured to maintain, in the email linkage database 112, a plurality of associations (e.g., linkages) between a plurality of emails and a plurality of multi-dimensional (MD) vectors of the plurality of emails. Each association is between a respective email of the plurality of emails and a respective MD vector of the plurality of MD vectors that corresponds to the respective email.

The management agent 209 may be configured to identify, based on one or more keywords, a set of MD vectors of the plurality of MD vectors. The management agent 209 may be configured to select, from the email linkage database 112, a set of emails associated with the set of MD vectors. The management agent 209 may be configured to provide (e.g., send, transmit) the set of emails to the BCM system 110 to generate, based on the set of emails or the MD vectors, a set of clusters to represent patterns in the set of emails.

The management agent 209 may be configured to identify, based on one or more keywords, the set of MD vectors of the plurality of MD vectors responsive to receiving a request for one or more emails associated with the one or more keywords. The management agent 209 may be configured to identify, based on the one or more keywords, the set of MD vectors of the plurality of MD vectors responsive to determining an expiration of a counter according to a predetermined time (e.g., days, weeks, months, etc.).

The management agent 209 may be configured to provide (e.g., transmit, send), for each email of the plurality of emails, the email to a natural language processing (NLP) model that is trained to vectorize one or more portions of the email into an MD vector. The management agent 209 may be configured to generate, using the NLP model, the plurality of MD vectors based on one or more portions of the plurality of emails.

The management agent 209 may be configured to train, using training data, the NLP model to vectorize at least one of a subject of the email or a body of the email into an MD vector. In some embodiments, the management agent 209 may be configured to train, using training data, the NLP model to vectorize at least one of a subject of the email or a body of the email into an MD vector without vectorizing other portions (e.g., sender address, recipient address, attachments, etc.) of the email.

The management agent 209 may be configured to provide, for each email of the plurality of emails, the email to a classifier model trained to generate a maliciousness score indicative of a likelihood of the email including malicious content. The management agent 209 may be configured to generate, using the classifier model 108, a plurality of maliciousness scores based on the plurality of emails.

The management agent 209 may be configured to update the plurality of associations to further be associated with the plurality of maliciousness scores. The management agent 209 may be configured to identify, based on the one or more keywords, the set of MD vectors of the plurality of MD vectors by performing an approximate near-neighbor search of the MD vectors of the plurality of MD vectors for semantic matches between content of the plurality of MD vectors and the one or more keywords.

The EPM system 106 includes a network interface 206a configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the EPM system 106 includes a plurality of network interfaces 206a of different types, allowing for connections to a variety of networks, such as local area networks (public or private) or wide area networks including the Internet, via different sub-networks.

The EPM system 106 includes an input/output device 205a configured to receive user input from and provide information to a user. In this regard, the input/output device 205a is structured to exchange data, communications, instructions, etc. with an input/output component of the EPM system 106. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the EPM system 106, such as a built-in display, touch screen, microphone, etc., or external to the housing of the EPM system 106, such as a monitor connected to the EPM system 106, a speaker connected to the EPM system 106, etc., according to various embodiments. In some embodiments, the EPM system 106 includes communication circuitry for facilitating the exchange of data, values, messages, and the like between the input/output device 205a and the components of the EPM system 106. In some embodiments, the input/output device 205a includes machine-readable media for facilitating the exchange of information between the input/output device 205a and the components of the EPM system 106. In still another embodiment, the input/output device 205a includes any combination of hardware components (e.g., a touchscreen), communication circuitry, and machine-readable media.

The EPM system 106 includes a device identification component 207a (shown in FIG. 2A as device ID component 207a) configured to generate and/or manage a device identifier associated with the EPM system 106. The device identifier may include any type and form of identification used to distinguish the EPM system 106 from other computing devices. In some embodiments, to preserve privacy, the device identifier may be cryptographically generated, encrypted, or otherwise obfuscated by any device and/or component of the EPM system 106. In some embodiments, the EPM system 106 may include the device identifier in any communication (e.g., classifier performance data, input message, parameter message, etc.) that the EPM system 106 sends to a computing device.

The EPM system 106 includes a bus (not shown), such as an address/data bus or other communication mechanism for communicating information, which interconnects the devices and/or components of the EPM system 106, such as processing device 202a, network interface 206a, input/output device 205a, and device ID component 207a.

In some embodiments, some or all of the devices and/or components of EPM system 106 may be implemented with the processing device 202a. For example, the EPM system 106 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the BCM system 110 of the environment in FIG. 1, according to some embodiments. While various devices, interfaces, and logic with particular functionality are shown, it should be understood that the BCM system 110 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The BCM system 110 includes a processing device 202b (e.g., general purpose processor, a PLD, etc.), which may be composed of one or more processors, and a memory 204b (e.g., synchronous dynamic random-access memory (DRAM), read-only memory (ROM)), which may communicate with each other via a bus (not shown). The processing device 202b includes identical or nearly identical functionality as processing device 202a in FIG. 2a, but with respect to devices and/or components of the BCM system 110 instead of devices and/or components of the EPM system 106.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the BCM system 110 instead of devices and/or components of the EPM system 106.

The processing device 202a executes a clustering agent 111 that may be configured to identify, based on one or more keywords, a set of MD vectors of the plurality of MD vectors. The clustering agent 111 may be configured to select, from the email linkage database 112, a set of emails associated with the set of MD vectors.

The clustering agent 111 may be configured to generate, based on the set of emails or the MD vectors, a set of clusters to represent patterns in the set of emails. The clustering agent 111 may be configured to generate, based on the set of emails or MD vectors, the set of clusters to represent the patterns in the set of emails by extracting a plurality of portions from the set of emails. The clustering agent 111 may further be configured to perform a first type of hashing technique on the plurality of portions to generate a plurality of numerical signatures. The clustering agent 111 may further be configured to group, using a second type of hashing technique, the plurality of numerical signatures into a plurality of groups. In some embodiments, the first type of hashing technique is a MinHash technique and the second type of hashing technique is a locality-sensitive hashing (LSH) technique.

The clustering agent 111 may be configured to transmit the set of clusters to one or more client devices 102 to cause the client devices 102 to display the set of clusters and/or the set of emails corresponding to the set of clusters on a screen 103.

The BCM system 110 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the BCM system 110 instead of devices and/or components of the EPM system 106.

The BCM system 110 includes an input/output device 205b configured to receive user input from and provide information to a user. In this regard, the input/output device 205b is structured to exchange data, communications, instructions, etc. with an input/output component of the BCM system 110. The input/output device 205b includes identical or nearly identical functionality as input/output device 205a in FIG. 2A, but with respect to devices and/or components of the BCM system 110 instead of devices and/or components of the EPM system 106.

The BCM system 110 includes a device identification component 207b (shown in FIG. 2B as device ID component 207b) configured to generate and/or manage a device identifier associated with the BCM system 110. The device ID component 207b includes identical or nearly identical functionality as device ID component 207a in FIG. 2A, but with respect to devices and/or components of the BCM system 110 instead of devices and/or components of the EPM system 106.

The BCM system 110 includes a bus (not shown), such as an address/data bus or other communication mechanism for communicating information, which interconnects the devices and/or components of the BCM system 110, such as processing device 202b, network interface 206b, input/output device 205b, and device ID component 207b.

In some embodiments, some or all of the devices and/or components of the BCM system 110 may be implemented with the processing device 202b. For example, the BCM system 110 may be implemented as a software application stored within the memory 204b and executed by the processing device 202b. Accordingly, such an embodiment can be implemented with minimal or no additional hardware costs. In some embodiments, any of these above-recited devices and/or components rely on dedicated hardware specifically configured for performing operations of the devices and/or components.

Figure 2C:
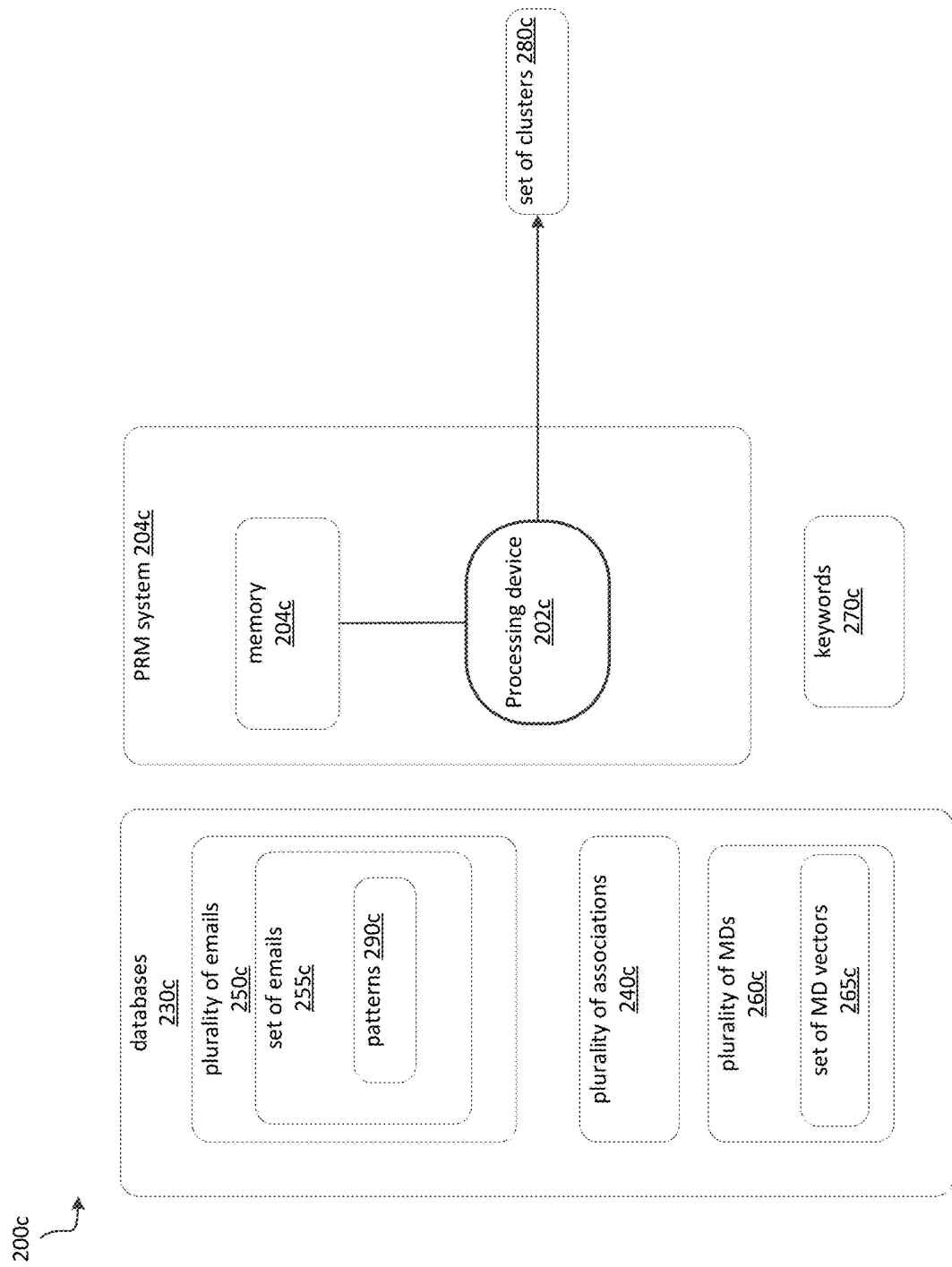
FIG. 2C is a block diagram depicting an example environment for using a pattern recognition management (PRM) system, according to some embodiments.

FIG. 2C is a block diagram depicting an example environment 200c for using a pattern recognition management (PRM) system, according to some embodiments. The PRM system 204c includes a memory 204c and a processing device 202c that is operatively coupled to the memory 204c. The processing device 202c is configured to maintain, in one or more databases 230c, a plurality of associations 240c between a plurality of emails 250c and a plurality of multi-dimensional (MD) vectors 260c of the plurality of emails 250c. Each association of the plurality of associations 240c is between a respective email of the plurality of emails 250c and a respective MD vector of the plurality of MD vectors 260c that corresponds to the respective email. The processing device 202c is configured to identify, based on one or more keywords 270c, a set of MD vectors 265c of the plurality of MD vectors 260c. The processing device 202c is configured to select, from the one or more databases 230c, a set of emails 255c associated with the set of MD vectors 265c. The processing device 202c is configured to generate, based on the set of emails 255c or the set of MD vectors 265c, a set of clusters 280c to represent patterns 290c in the set of emails 255c.

Figure 3:
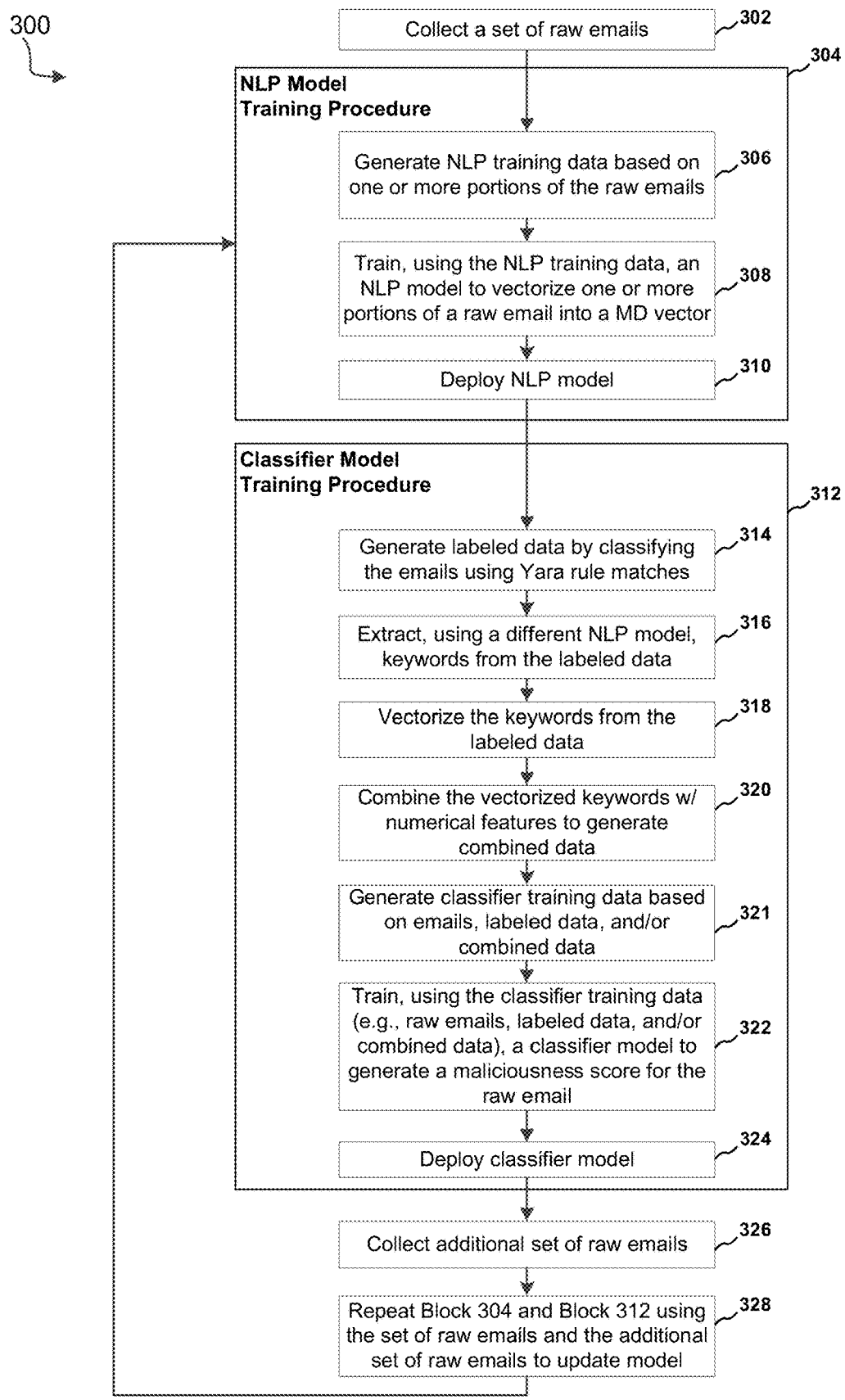
FIG. 3 is a flow diagram depicting a procedure for training the natural language processing model (NLP) and the classifier model 108 of the PRM system in FIG. 1, according to some embodiments.

FIG. 3 is a flow diagram depicting a procedure for training the natural language processing model (NLP) and the classifier model 108 of the PRM system in FIG. 1, according to some embodiments. Although specific function blocks ("blocks") are disclosed in procedure 300, such blocks are examples. That is, embodiments are well suited to performing various other blocks or variations of the blocks recited in procedure 300. It is appreciated that the blocks in procedure 300 may be performed in an order different than presented, and that not all of the blocks in procedure 300 may be performed.

The procedure 300 will be described with respect to FIG. 1. At block 302, the PRM system 104 collects (e.g., retrieves, acquires) a set of raw emails from one or more email servers. At block 304, the PRM system 104 performs an NLP model training procedure 304 according to blocks 306, 308, and 310. At block 306, the PRM system 104 generates a set of training data (sometimes referred to as, "NLP training data") based on one or more portions of the set of raw emails. A portion of a raw email (sometimes referred to as, email) may include a textual portion (e.g., body, subject, sender address, and/or recipient address) of the raw email or a textual portion of an attachment of the raw email. In some embodiments, the PRM system 104 generates the set of training data based on only the subject and body of the raw emails, and ignores the other portions (e.g., sender address, recipient address, etc.) of the raw emails. At block 308, the PRM system 104 trains, using the NLP training data, the NLP model 107 to ingest a raw email and vectorize one or more portions (or all portions) of the raw email into a multi-dimensional (MD) vector or vector space that may be used for clustering or semantic search. In some embodiments, the PRM system 104 may select a pre-trained NLP model (e.g., paraphrase-MiniLM-L6-v2) that maps sentences of an email to a MD (e.g., 384 dimensions) vector.

At block 310, the PRM system 104 deploys ("bring on-line") the NLP model 107 into the environment 100 such that a computing device (e.g., PRM system 104) may use the NLP model 107 to vectorize one or more portions of a raw email. The PRM system 104 deploys the NLP model 107 into the environment 100 by executing (e.g., running) the NLP model 107 on the PRM system 104 or on a remote computing system (e.g., a cloud computing network).

At block 312, the PRM system 104 performs a classifier model training procedure 312 according to blocks 314, 316, 318, 320, 322, and 324. At block 314, the PRM system 104 uses YARA rule matches to label each raw email as malware, (e.g., a malicious program or code created to do harm to a computer), suspicious text/code, spam, or clean text (e.g., a safe email) to generate labeled data. A YARA rule uses code to define several variables containing patterns found in a sample of malware. The PRM system 104 uses the YARA rule to label a raw email by determining whether some or all of the conditions of the YARA rule are met.

At block 316, the PRM system 104 extracts, using a different NLP model, keywords from the labeled data. The different NLP model may be an NLP python package Yet Another Keyword Extractor (YAKE) that is configured to extract keywords from text based on statistical importance.

At block 318, the PRM system 104 vectorizes the extracted keywords from the labeled data using an algorithm, such as a TF-IDF (Term Frequency-Inverse Document Frequency) algorithm that uses the frequency of words to determine how relevant the words are to a given document or email.

At block 320, the PRM system 104 combines the vectorized keywords with numerical features to generate combined data. In some embodiments, the numerical features may include metadata extracted from the email itself, e.g., the number of attachments, IP addresses, domains.

At block 321, the PRM system 104 generates a set of training data (sometimes referred to as, "classifier training data") based on the set of raw emails, the labeled data, and/or the combined data. At block 322, the PRM system 104 trains, using the classifier training data, the classifier model 108 to generate a maliciousness score for the raw email. The maliciousness score indicates a likelihood of the raw email including malware, suspicious text/code, spam, or clean text (e.g., a safe email). In some embodiments, the PRM system 104 may select a pre-trained Extreme Gradient Boost (XGBoost) model.

At block 324, the PRM system 104 deploys the classifier model 108 into the environment 100 such that a computing device (e.g., PRM system 104) may use the classifier model 108 to predict semantics of text within a raw email.

At block 326, the PRM system 104 collects an additional set of raw emails from the one or more email servers. At block 328, the PRM system 104 repeats block 304 and block 312 using the set of raw emails and the additional set of raw emails to update the classifier model 108 to improve the performance (e.g., accuracy, efficiency) of the classifier model 108. In some embodiments, the PRM system 104 repeats block 304 and block 312 using only the additional set of raw emails to update model.

Figure 4A:
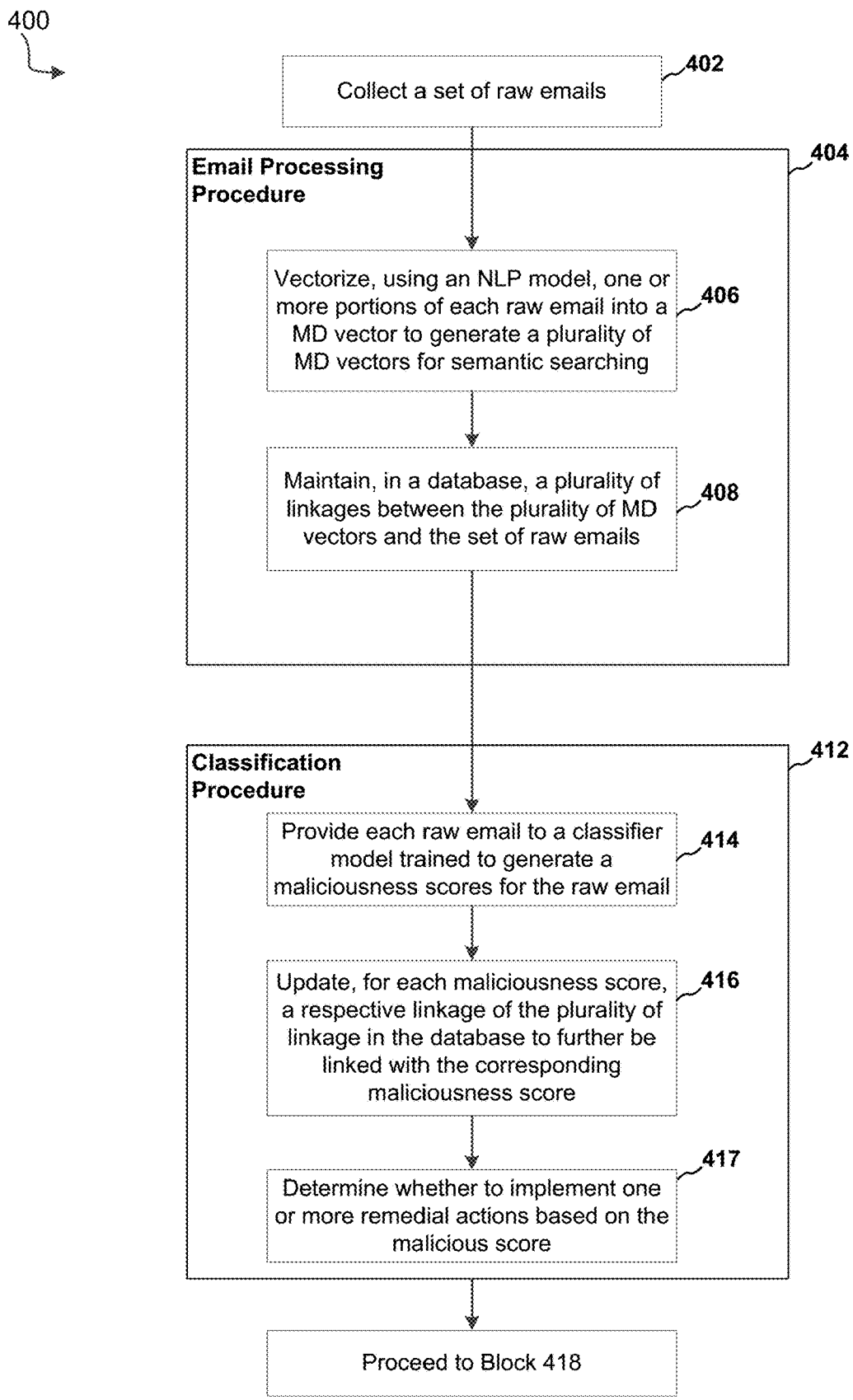
FIGS. 4A-4B is a flow diagram depicting a procedure for using the trained NLP model 107 and the trained classifier model 108 of the PRM system in FIG. 1 to identify patterns in large quantities of automatically collected emails, according to some embodiments.
Figure 4B:
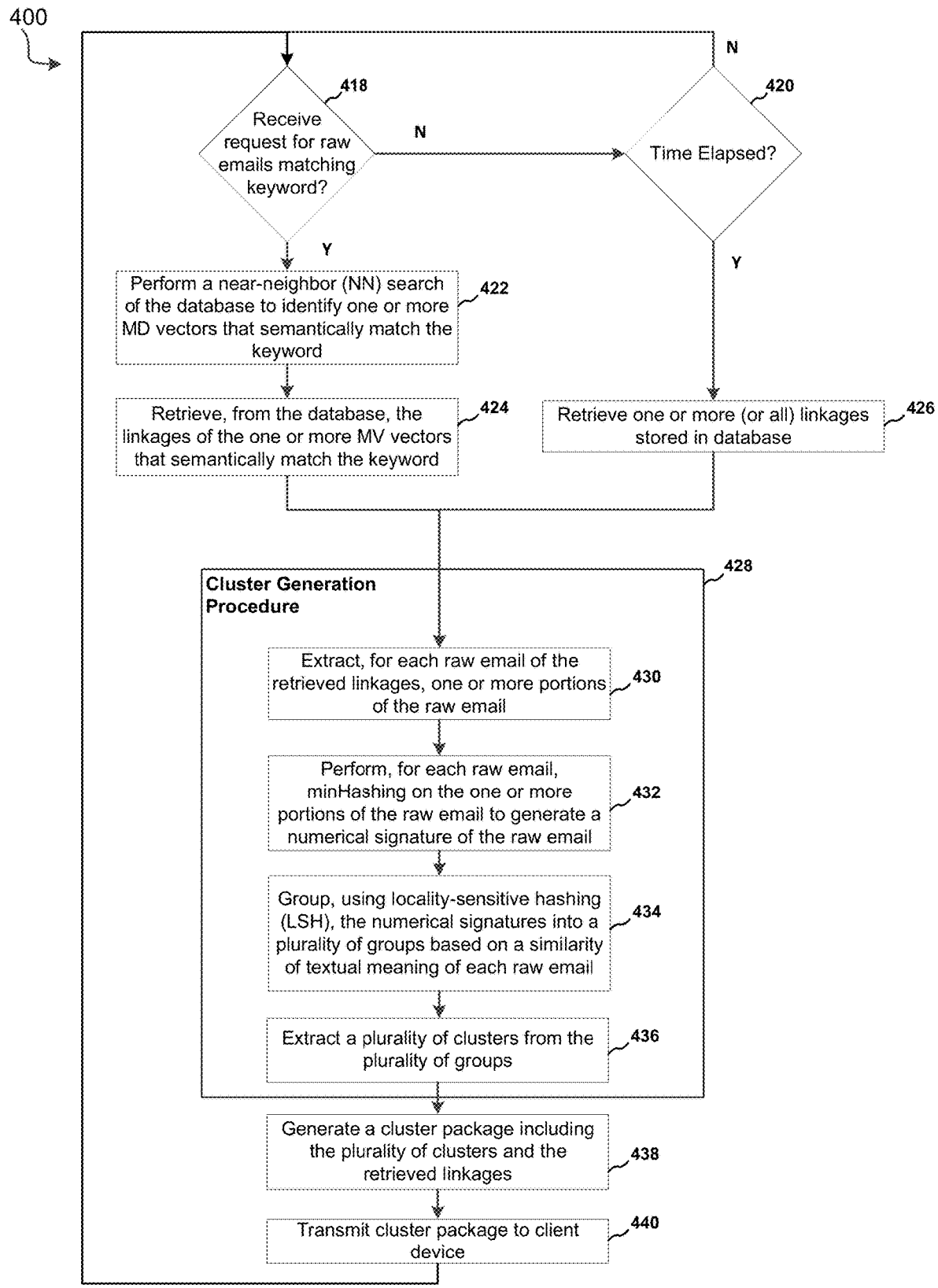

FIGS. 4A-4B is a flow diagram depicting a procedure for using the trained NLP model 107 and the trained classifier model 108 of the PRM system in FIG. 1 to identify patterns in large quantities of automatically collected emails, according to some embodiments. Although specific function blocks ("blocks") are disclosed in procedure 400, such blocks are examples. That is, embodiments are well suited to performing various other blocks or variations of the blocks recited in procedure 400. It is appreciated that the blocks in procedure 400 may be performed in an order different than presented, and that not all of the blocks in procedure 400 may be performed.

The procedure 400 will be described with respect to FIG. 1. At block 402, the PRM system 104 collects a set of raw emails from one or more email servers.

At block 404, the PRM system 104 performs an email processing procedure 404 according to blocks 406 and 408. At block 406, the PRM system 104 vectorizes, using the trained NLP model 107, one or more portions of each raw email into an MD vector to generate a plurality of MD vectors that may be used to semantically search the content (e.g., textual content) of the raw emails (including email attachments). At block 408, the PRM system 104 maintains, in the email linkage database 112, a plurality of linkages (e.g., associations) between the plurality of MD vectors and the set of raw emails such that each linkage respectively associates a particular MD vector to a particular raw email. For example, the PRM system 104 stores (a) an identifier of a particular raw email or a copy of the particular raw email itself and (b) a particular MD vector that corresponds to the particular raw email in a database schema (e.g., a table, a matrix), which is a logical configuration of all or part of a relational database. The database scheme maintains a link (e.g., association) between the identifier and the MD vector. An identifier of a raw email may be a network address of a file source (e.g., database, server, etc.) that stores the raw email and/or a file location of the raw email in a file system of the file source, both of which may be used by a computing device (e.g., PRM system 104, client device 102) to retrieve the raw email from the file source.

At block 412, the PRM system 104 performs a classifier procedure 412 according to blocks 414 and 416. At block 414, the PRM system 104 provides each raw email to the classifier model 108 to cause the classifier model 108 to generate a plurality of maliciousness score, where each maliciousness score indicates the likelihood of the respective raw email including malware, suspicious text/code, spam, or clean text (e.g., a safe email). The higher the maliciousness score, then the higher the likelihood that the raw email includes the respective text/code.

At block 416, the PRM system 104 updates, for each maliciousness score, a respective linkage of the plurality of linkage in the email linkage database 112 to further be linked with the corresponding maliciousness score. For example, the PRM system 104 identifies the linkage that is associated with the raw email and adds the maliciousness score to the linkage, such that the linkage associates (a) an identifier of the raw email or a copy of the raw email itself, (b) an MD vector that corresponds to the raw email, and (c) the maliciousness score of the raw email.

At block 417, the PRM system 104 determines whether to implement one or more remedial actions based on the maliciousness score. For example, the PRM system 104 may compare a maliciousness score and a predetermined threshold valve. If the risk score is above the predetermined threshold value, then the PRM system 104 may determine to implement one or more remedial actions. Alternatively, if the risk score is below the predetermined threshold value, then the PRM system 104 may determine to not implement a remedial action. A remedial action may include, for example, prompting an alert or sending an alert to another computing device, where the alert indicates that the corresponding raw email includes malicious components and/or malicious activity. A remedial action may include cleaning the corresponding raw email to remove and/or deactivate the malicious components and/or activity from the raw email. The PRM system 104 may perform block 417 for one or more of the malicious scores that are associated with the raw emails.

At block 418, the PRM system 104 determines whether it has received a request (shown in FIG. 1 as, "email request") from a client device 102 for raw emails matching one or more keywords. For example, a keyword may be a single word (e.g., "cat"), a phrase (e.g., "The cat is orange"), or a plurality of keywords (e.g., "cat, dog") that are separated by a delimiter (e.g., a period, a comma, a semicolon, etc.). If the PRM system 104 receives an email request, then the PRM system 104 proceeds to block 422 and performs an approximate near-neighbor (NN) search of the MD vectors in the email linkage database 112 to identify one or more MD vectors that contain text (e.g., text that corresponds to the text of raw emails) that semantically matches the keyword.

At block 424, the PRM system 104 retrieves, from the email linkage database 112, the linkages of the one or more MV vectors that semantically match the keyword.

Alternatively, if the PRM system 104 does not receive an email request at block 418, then the PRM system 104 proceeds to block 420 and determines whether a predetermined time (e.g., days, weeks, months) has elapsed or expired. For example, the PRM system 104 maintains a counter and determines whether the time on the counter has elapsed. If the counter has not elapsed, then the PRM system 104 proceeds to block 418 to repeat block 418. However, if the counter has elapsed, then the PRM system 104 proceeds to block 426 to retrieve one or more (or all) linkages that are stored in the email linkage database 112. For example, the PRM system 104 may select all the linkages that are stored in the email linkage database 112, a subset of the linkages that correspond to a particular time frame (e.g., linkages from the prior week, 1 month, 3 months, etc.), or the linkages that correspond to the raw emails that would produce the largest cluster.

Thus, the PRM system 104 retrieves the linkages from the email linkage database 112 that semantically match the keyword if the PRM system 104 receives an email request from a client device 102, but retrieves the one or more (or all) linkages from the email linkage database 112 if a counter expires.

At block 428, the PRM system 104 performs a cluster generation procedure 428 according to blocks 430, 432, 434, and 436. At block 430, the PRM system 104 extracts, for each raw email of the retrieved linkages, one or more portions (e.g., body, subject, sender address, and/or recipient address) of the raw email. At block 432, the PRM system 104 performs, for each raw email, a first type of hashing technique on the one or more portions of the raw email to generate a numerical signature of the raw email.

In some embodiments, a first type of hashing technique may be a MinHashing or MinHash function. A MinHashing function converts tokenized text into a set of hash integers, then selects the minimum value. MinHashing is an algorithm that can be used to quickly compare large sets of data, such as two tokenized texts. It works by creating smaller "signatures" for each set. These signatures represent the main characteristics of the data sets. First, the algorithm chooses random hash functions. It then applies these functions to the tokens in each text. The hash functions convert the tokens into numerical values. For each hash function, the algorithm finds the smallest value among the hashed tokens. This smallest value is called a "MinHash". The collection of all MinHash values forms the signature for that tokenized text. By calculating the similarity between the signatures, the similarity between the texts can be estimated. At block 434, the PRM system 104 groups, using a second type of hashing technique, the numerical signatures into a plurality of groups based on a similarity of a textual meaning of each raw email.

In some embodiments, a second type of hashing technique may be a locality-sensitive hashing (LSH) function. The LSH function groups similar MinHash signatures together, by breaking the MinHashes into a series of bands comprised of rows. For example, 200 MinHashes might be broken into 50 bands of 4 rows each. Each band is hashed to a bucket. If two emails have the exact same MinHashes in a band, they will be hashed to the same bucket, and so will be considered candidate pairs (e.g., potentially similar). Each pair of emails has as many chances to be considered a candidate as there are bands, and the fewer rows there are in each band, the more likely it is that each email will match another.

At block 436, the PRM system 104 extracts a plurality of clusters from the plurality of groups. That is, the LSH technique allows the PRM system 104 to produce clustering results on-demand in a user-interface of the PRM system 104, even if the search results contain thousands of emails. In some embodiments, the PRM system 104 may use a TF-IDF transformation to find the topic of a cluster of raw emails based on its content (e.g., textual content). This allows the PRM system 104 to better be able to identify the clusters of the raw emails.

At block 438, the PRM system 104 generates a cluster package that includes the plurality of clusters and/or the corresponding linkages. At block 440, the PRM system 104 transmits the cluster package to client device 102. The client device 102 presents the cluster package on a screen 103 to display the plurality of clusters and/or the corresponding linkages.

Figure 5:
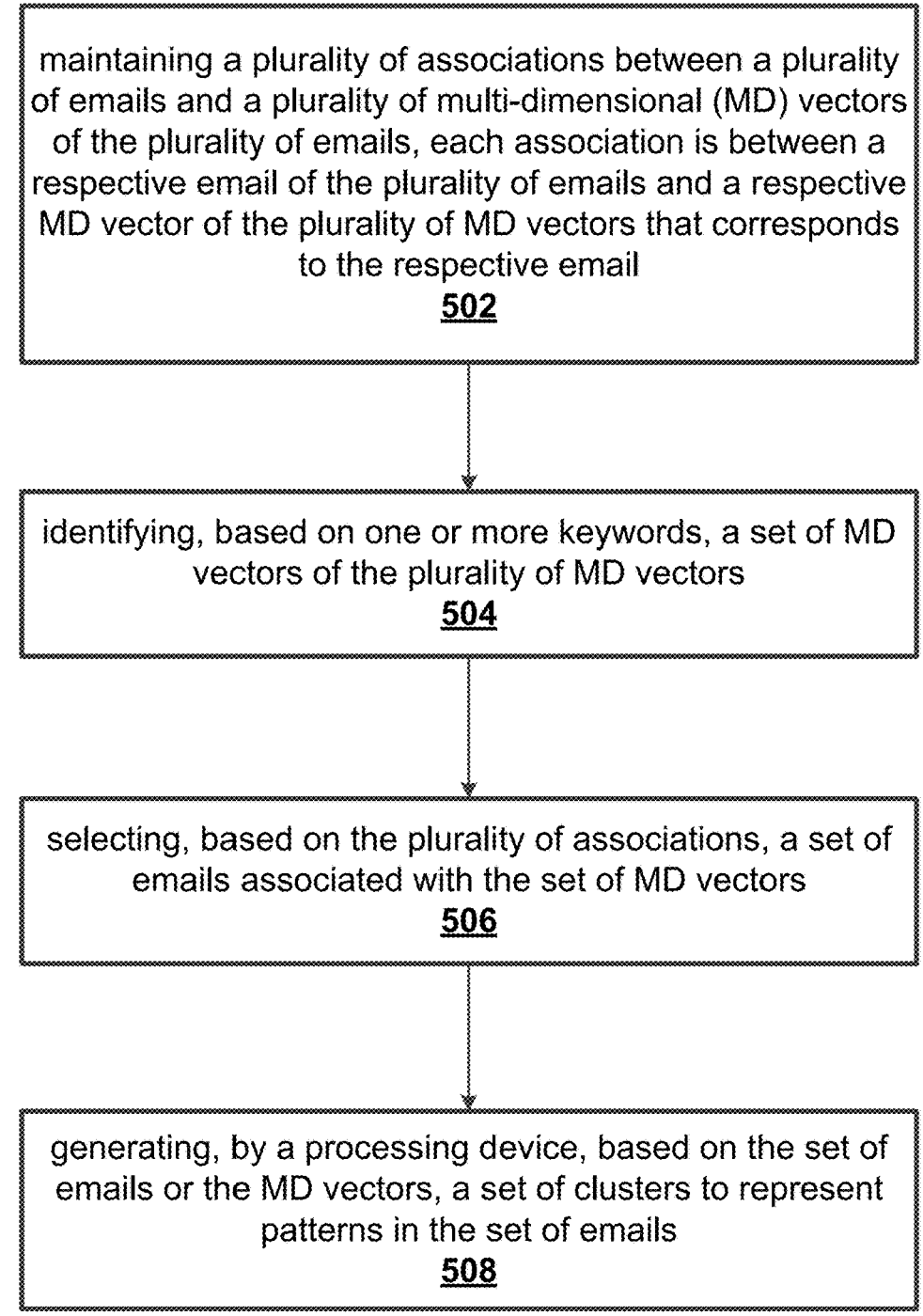
FIG. 5 is a flow diagram depicting a method of identifying patterns in large quantities of automatically collected emails, according to some embodiments.

FIG. 5 is a flow diagram depicting a method of identifying patterns in large quantities of automatically collected emails, according to some embodiments. Method 500 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 500 may be performed by a pattern recognition management (PRM) system, such as the PRM system 104 in FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

As shown in FIG. 5, the method 500 includes the block 502 of maintaining a plurality of associations between a plurality of emails and a plurality of multi-dimensional (MD) vectors of the plurality of emails. Each association is between a respective email of the plurality of emails and a respective MD vector of the plurality of MD vectors that corresponds to the respective email. The method 500 includes the block 504 of identifying, based on one or more keywords, a set of MD vectors of the plurality of MD vectors. The method 500 includes the block 506 of selecting, based on the plurality of associations, a set of emails associated with the set of MD vectors. The method 500 includes the block 508 of generating, by a processing device, based on the set of emails or the MD vectors, a set of clusters to represent patterns in the set of emails.

Figure 6:
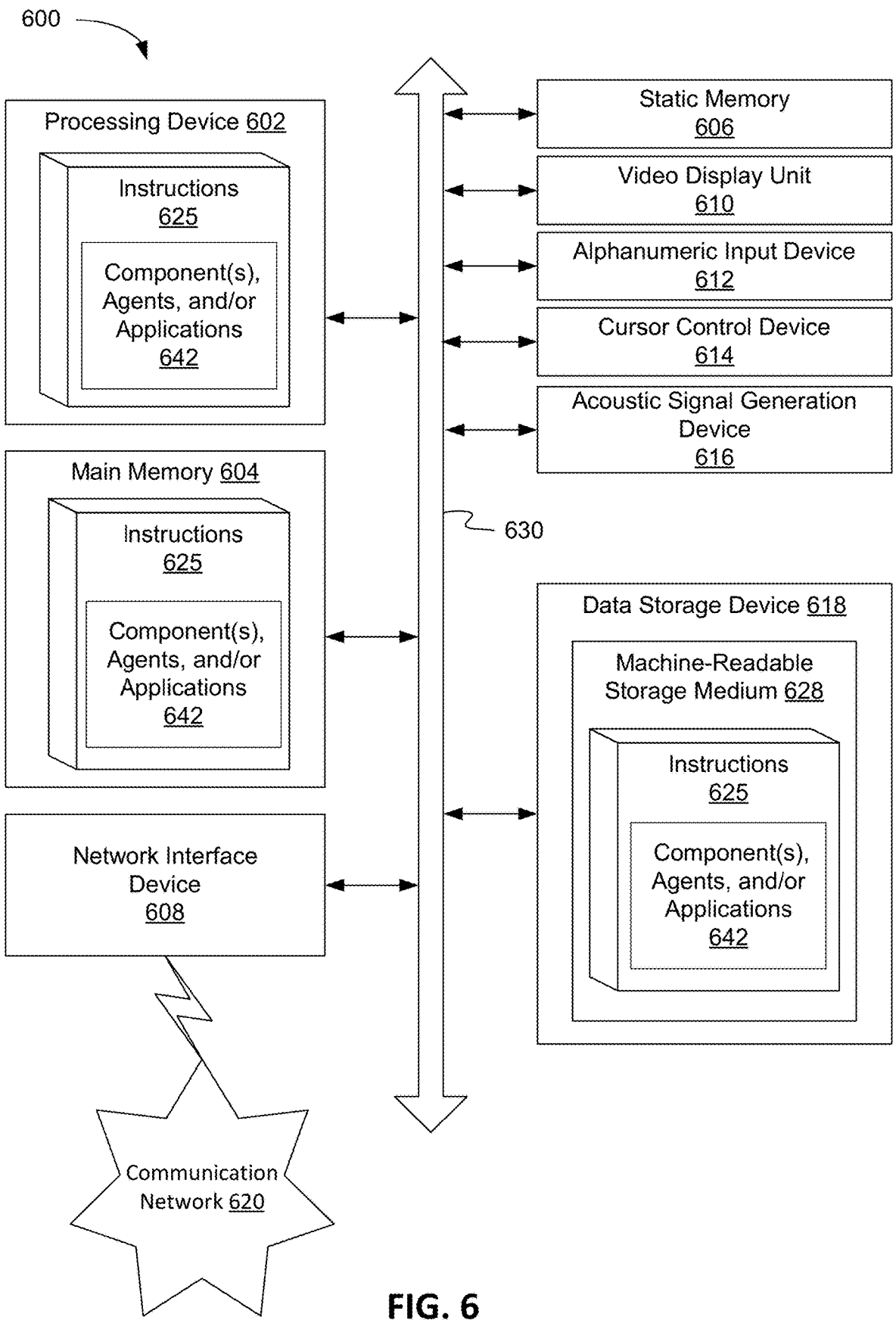
FIG. 6 is a block diagram of an example computing device 600 that may perform one or more of the operations described herein, in accordance with some embodiments.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general-purpose processor, a PLD, etc.) 602, a main memory 604 (e.g., synchronous dynamic random-access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a communication network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for one or more components/programs/applications 642 (e.g., an NLP model 107, a classifier model 108, an EP agent 209, a clustering agent 111 in FIG. 2A, etc.) for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a communication network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "maintaining," "identifying," "selecting." "generating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second." "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112 (f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:
    receiving a request for one or more emails associated with one or more keywords;
    maintaining a plurality of associations between a plurality of emails and a plurality of multi-dimensional (MD) vectors of the plurality of emails, each association is between a respective email of the plurality of emails and a respective MD vector of the plurality of MD vectors that corresponds to the respective email;
    identifying, based on the one or more keywords, a set of MD vectors of the plurality of MD vectors;
    selecting, based on the plurality of associations, a set of emails associated with the set of MD vectors;
    extracting, from the set of emails, a first portion of the set of emails and a second portion of the set of emails;
    generating, by a processing device, a set of clusters to represent patterns in the set of emails by performing a MinHash function on the first portion of the set of emails to generate a first set of numerical signatures, performing the MinHash function on the second portion of the set of emails to generate a second set of numerical signatures, selecting a first minimum numerical signature from the first set of numerical signatures, and selecting a second minimum numerical signature from the first set of numerical signatures;
    grouping the first minimum numerical signature into a first group based on a first similarity and the second minimum numerical signature into a second group based on a second similarity;
    generating training data by extracting a plurality of keywords from labeled data associated with a different set of emails and vectorizing the plurality of keywords by determining a frequency in which the plurality of keywords appear in the different set of emails;
    providing the plurality of emails to a classifier model trained with the training data to generate a plurality of maliciousness scores indicating likelihoods of the plurality of emails including malicious content; and
    updating the plurality of associations between the plurality of emails and the plurality of MD vectors of the plurality of emails to further be associated with the plurality of maliciousness scores.

2. The method of claim 1, wherein identifying, based on the one or more keywords, the set of MD vectors of the plurality of MD vectors is responsive to:
    determining an expiration of a counter.

3. The method of claim 1, further comprising:
providing the plurality of emails to a natural language processing (NLP) model trained to vectorize one or more portions of each email of the plurality of emails into a corresponding MD vector of the plurality of MD vectors; and
generating, using the NLP model, the plurality of MD vectors.

4. The method of claim 3, further comprising:
training the NLP model to vectorize at least one of a subject of the email or a body of the email into the MD vector.

5. The method of claim 1, wherein identifying, based on the one or more keywords, the set of MD vectors of the plurality of MD vectors further comprises:
performing an approximate near-neighbor search of the set of MD vectors of the plurality of MD vectors for semantic matches between content of the plurality of MD vectors and the one or more keywords.

6. The method of claim 1, further comprising:
causing the set of clusters to appear on a display.

7. A system comprising:
a memory; and
a processing device, operatively coupled to the memory, to:
receive a request for one or more emails associated with one or more keywords;
maintain a plurality of associations between a plurality of emails and a plurality of multi-dimensional (MD) vectors of the plurality of emails, each association is between a respective email of the plurality of emails and a respective MD vector of the plurality of MD vectors that corresponds to the respective email;
identify, based on the one or more keywords, a set of MD vectors of the plurality of MD vectors;
select, based on the plurality of associations, a set of emails associated with the set of MD vectors;
extract, from the set of emails, a first portion of the set of emails and a second portion of the set of emails;
generate a set of clusters to represent patterns in the set of emails by performing a MinHash function on the first portion of the set of emails to generate a first set of numerical signatures and the second portion of the set of emails to generate a second set of numerical signatures, and selecting a first minimum numerical signature from the first set of numerical signatures and a second minimum numerical signature from the first set of numerical signatures;
group the first minimum numerical signature into a first group based on a first similarity and the second minimum numerical signature into a second group based on a second similarity;
generate training data by extracting a plurality of keywords from labeled data associated with a different set of emails and vectorizing the plurality of keywords by determining a frequency in which the plurality of keywords appear in the different set of emails;
provide the plurality of emails to a classifier model trained with the training data to generate a plurality of maliciousness scores indicating likelihoods of the plurality of emails including malicious content; and
update the plurality of associations between the plurality of emails and the plurality of MD vectors of the plurality of emails to further be associated with the plurality of maliciousness scores.

8. The system of claim 7, wherein the processing device to:
determine an expiration of a counter.

9. The system of claim 7, wherein the processing device to:
provide the plurality of emails to a natural language processing (NLP) model trained to vectorize one or more portions of the email of the plurality of emails into a corresponding MD vector of the plurality of MD vectors; and
generate, using the NLP model, the plurality of MD vectors.

10. The system of claim 9, wherein the processing device to:
train the NLP model to vectorize at least one of a subject of the email or a body of the email into the MD vector.

11. The system of claim 7, wherein to identify, based on the one or more keywords, the set of MD vectors of the plurality of MD vectors, the processing device to:
perform an approximate near-neighbor search of the set of MD vectors of the plurality of MD vectors for semantic matches between content of the plurality of MD vectors and the one or more keywords.

12. A non-transitory computer-readable medium storing instructions that, when execute by a processing device, cause the processing device to:
receive a request for one or more emails associated with one or more keywords;
maintain a plurality of associations between a plurality of emails and a plurality of multi-dimensional (MD) vectors of the plurality of emails, each association is between a respective email of the plurality of emails and a respective MD vector of the plurality of MD vectors that corresponds to the respective email;
identify, based on the one or more keywords, a set of MD vectors of the plurality of MD vectors;
select, based on the plurality of associations, a set of emails associated with the set of MD vectors;
extract, from the set of emails, a first portion of the set of emails and a second portion of the set of emails;
generate, by the processing device, based on the set of emails or the set of MD vectors, a set of clusters to represent patterns in the set of emails by performing a MinHash function on the first portion of the set of emails to generate a first set of numerical signatures and the second portion of the set of emails to generate a second set of numerical signatures, and selecting a first minimum numerical signature from the first set of numerical signatures and a second minimum numerical signature from the first set of numerical signatures;
grouping the first minimum numerical signature into a first group based on a first similarity and the second minimum numerical signature into a second group based on a second similarity;
generating training data by extracting a plurality of keywords from labeled data associated with a different set of emails and vectorizing the plurality of keywords by determining a frequency in which the plurality of keywords appear in the different set of emails;
providing the plurality of emails to a classifier model trained with the training data to generate a plurality of maliciousness scores indicating likelihoods of the plurality of emails including malicious content; and updating the plurality of associations between the plurality of emails and the plurality of MD vectors of the plurality of emails to further be associated with the plurality of maliciousness scores.

\* \* \* \* \*